United States Patent
Hatoh et al.

(10) Patent No.: US 6,210,823 B1
(45) Date of Patent: Apr. 3, 2001

(54) POLYMER ELECTROLYTE FUEL CELL

(75) Inventors: Kazuhito Hatoh, Daito; Eiichi Yasumoto, Katano; Kazufumi Nishida, Moriguchi; Hisaaki Gyoten, Shijonawate; Hideo Ohara, Kadoma; Makoto Uchida, Hirakata; Yasushi Sugawara, Neyagawa; Teruhisa Kanbara, Ikeda; Toshihiro Matsumoto, Ibaraki; Kouji Nakagawa, Habikino, all of (JP)

(73) Assignee: Matsushita Electric Industrial Co. Ltd., Osaka-fu (JP)

( * ) Notice: Subject to any disclaimer, the term of this patent is extended or adjusted under 35 U.S.C. 154(b) by 0 days.

(21) Appl. No.: 09/374,517

(22) Filed: Aug. 16, 1999

(30) Foreign Application Priority Data

Aug. 19, 1998 (JP) .................................. 10-233153
Aug. 20, 1998 (JP) .................................. 10-234371
Aug. 20, 1998 (JP) .................................. 10-234501

(51) Int. Cl.$^7$ .................................................... H01M 8/02
(52) U.S. Cl. .................................................... 429/30; 429/37
(58) Field of Search .................................. 429/12, 30, 37, 429/40

(56) References Cited

U.S. PATENT DOCUMENTS

| 4,345,009 | * | 8/1982 | Fahle et al. ............................ 429/37 |
| 4,642,274 | | 2/1987 | Tsutsumi et al. . |
| 5,484,666 | | 1/1996 | Gibb et al. . |
| 5,789,091 | | 8/1998 | Wozniczka et al. . |
| 6,040,072 | * | 3/2000 | Murphy et al. ........................ 429/12 |

FOREIGN PATENT DOCUMENTS

| 61-058158 | 3/1986 | (JP) . |
| 61-273873 | 12/1986 | (JP) . |
| WO 95/28010 | 10/1995 | (WO) . |

* cited by examiner

Primary Examiner—Stephen Kalafut
Assistant Examiner—M. Wills
(74) Attorney, Agent, or Firm—Akin, Gump, Strauss, Hauer & Feld, L.L.P.

(57) ABSTRACT

The present invention provides a polymer electrolyte fuel cell having a small-sized, light-weighted mechanism for fastening a stack of unit cells assembly. The polymer electrolyte fuel cell of the present invention includes a stack of unit cells obtained by laying a plurality of unit cells one upon another; a first end plate disposed on one end of the stack of unit cells; a second end plate arranged on the other end of the stack of unit cells; an auxiliary plate disposed at least outside the first end plate; at least one set of restraining means, each of which has a band-like shape and restrains a first member located on one end of an assembly, which includes the stack of unit cells, the first and the second end plates, and the auxiliary plate, and a second member located on the other end of the assembly to restrict separation of the first member and the second member from each other; a screw fitted in a threaded hole formed in the auxiliary plate in such a manner that an end of the screw comes into contact with the first end plate; and compressive means that generates a repulsive force to compress the stack of unit cells when the screw is fitted in the threaded hole of the auxiliary plate.

18 Claims, 13 Drawing Sheets

POLYMER ELECTROLYTE FUEL CELL

BACKGROUND OF THE INVENTION

The present invention relates to a polymer electrolyte fuel cell that works at ordinary temperature and is used for portable power sources, electric vehicle power sources, and domestic cogeneration systems.

The polymer electrolyte fuel cell causes a gaseous fuel, such as gaseous hydrogen, and an oxidant gas, such as the air, to be subjected to electrochemical reactions at gas diffusion electrodes, thereby generating the electricity and the heat simultaneously. A pair of catalytic reaction layers, which are mainly composed of carbon powder with a platinum metal catalyst carried thereon, are closely attached to opposite faces of a polymer electrolyte membrane, which selectively transports hydrogen ions. A pair of diffusion layers having both the gas permeability and the electric conductivity are further arranged on the respective outer faces of the catalytic reaction layers. The catalytic reaction layer and the diffusion layer constitute each electrode.

A pair of conductive separator plates are arranged across the membrane electrode assembly so as to mechanically fix the assembly and cause the assembly to electrically connect with the assembly in series. A specific part of the separator plate that is in contact with the electrode of the assembly has a gas flow path, which feeds a supply of reaction gas to the electrode and flows out the gas evolved by the reaction and the remaining excess gas.

The structure of each unit cell included in such a fuel cell is described below with the drawings.

FIG. 11 shows a unit cell in which a pair of electrodes 1, each having a catalytic layer 2, are arranged across a polymer electrolyte membrane 3 to yield a membrane electrode assembly, the circumferential part of the polymer electrolyte membrane 3 is interposed between a pair of sealing members 17, and a pair of separator plates 4 are arranged across the membrane electrode assembly. The separator plate 4 has a gas flow path 5 for feeding a supply of the gaseous fuel or a supply of the oxidant gas to the electrode 1. The sealing member 17 prevents the gaseous hydrogen as the gaseous fuel and the air as the oxidant gas from leaking out of the fuel cell or from being mixed with each other. A separator plate having the gas flow path formed on its one surface and a flow path of cooling water formed on its other surface is applied for every two unit cells. An O ring is interposed between the separator plates having the flow path of cooling water, in order to prevent a leak of the cooking water.

FIG. 12 shows another sealing technique for preventing leaks of the gases and the cooling water. This technique arranges gaskets 19, which are composed of an appropriate resin or metal and have a substantially identical thickness with that of the electrode 1, around the electrodes 1. In this structure, the clearance between a separate plate 4 and the gasket 19 is sealed with a grease 20 or an adhesive. The clearance between the separator plates having the flow path of the cooling water is also sealed with the grease or the adhesive.

FIG. 13 shows another example, in which membrane electrode assemblies (hereinafter referred to as MEAs), each of which is obtained by interposing a polymer electrolyte membrane between a pair of electrodes having an identical size with that of the polymer electrolyte membrane, and separator plates are alternately laid one upon another. This technique causes specific parts of the MEA that require the gas sealing property, to be previously impregnated with a resin 21, which has sealing effect and subsequently solidifies. The solidified resin ensures the gas sealing property between the MEA and the separator plate.

Most of the fuel cells have a laminate structure in which a large number of unit cells having the above configuration are laid one upon another. In the course of operation of the fuel cells, heat is produced with generation of the electric power. In the stack of unit cells, a cooling plate is provided for every one or two unit cells, in order to keep the cell temperature at a substantially fixed level and simultaneously enable the generated thermal energy to be unitized, for example, in the form of warm water. The cooling plate is generally a thin metal plate which a heat transfer medium, such as cooling water, flows through. Another possible application forms a flow path of cooling water on the rear face of the separator plate included in the unit cell, so as to make the separator plate function as the cooling plate as discussed above. In this case, a cooling water flow path is formed on the rear face of the separator plate, which is included in each unit cell, to make a flow of cooling water. In this structure, O rings and gaskets are required to seal the heat transfer medium, such as cooling water. The O rings in the seal should be compressed to ensure the sufficient electric conductivity across the cooling plate.

The stack of unit cells generally has a so-called internal manifold arrangement having gas inlets, gas outlets, and inlets and outlets of cooling water to and from the respective unit cells, which are generally called manifolds, inside the stack of unit cells. In the case where the reformed city gas is used as the gaseous fuel to drive the cells, however, the CO concentration rises in the downstream area of the flow path of the gaseous fuel. This may cause the electrode to be poisoned with CO, which results in lowering the temperature and thereby further accelerating the poisoning of the electrode. In order to relieve the deterioration of the cell performance, the external manifold type is noted as the structure that increases the length of the gas supply and exhaust unit between the manifold and each unit cell.

In either of the internal manifold type and the external manifold type, the required process lays a plurality of unit cells including the cooling units one upon another in one direction to provide a stack of unit cells, arranges a pair of end plates outside the stack of unit cells, and fixes the stack of unit cells between the pair of end plates with tie rods. It is naturally desirable to urge the whole face of each unit cell as uniformly as possible. In other words, it is desirable that the substantially uniform compressive force is applied to the whole laminating faces of the stack of unit cells. By taking into account the mechanical strength, the end plates and the tie rods are generally made of a metal material, such as stainless steel. These end plates and tie rods are electrically insulated from the stack of unit cells by insulator plates, so that the electric current does not run outside through the end plates. One improved technique of fastening makes the tie rods pierce the through holes formed in the separator plates. Another improved technique binds the whole stack of unit cells via the end plates with metal belts.

In any of the sealing methods shown in FIGS. 11 through 13, the constant compressive force is required to maintain the sufficient sealing property. One adopted structure inserts a coiled spring or a disc spring between the tie rod and the end plate. The compressive force ensures the electric contact between the respective constituents of the cells including the separator plates, the electrodes, and the electrolyte membranes.

In the structure that disposes the sealing members or O rings around the electrodes for the purpose of the seal of the gas, for example, the gaseous hydrogen or the air, a relatively large plane pressure is required. The adopted arrangement accordingly presses the sealing member or the sealing part between the pair of separator plates, so as to maintain the sufficient sealing effect. It is thus required to apply a relatively large compressive force constantly. This, however, makes the fastening mechanism including the end plates and the tie rods bulky and heavy in weight, while the fuel cell is required to have less total weight.

The long-term application of a pressure to the seals and the electrodes causes distortion of the constituents and thereby lowers the plane pressure required for the seals and the electrodes. A mechanism for absorbing the distortion is thus required in the fastening mechanism. One adopted mechanism for that purpose installs a spring on the end of the tie rod. This is another factor of making the whole fuel cell undesirably bulky.

SUMMARY OF THE INVENTION

The object of the present invention is thus to solve the above problems and provide a polymer electrolyte fuel cell having a small-sized, simply-constructed fastening mechanism of a stack of unit cells.

Another object of the present invention is to provide a polymer electrolyte fuel cell having excellent long-term stability and a fastening mechanism of a stack of unit cells that reduces creep deformation due to the long-time application of a pressure.

The present invention is accordingly directed to a polymer electrolyte fuel cell having a stack of unit cells, which is provided by laying a plurality of unit cells one upon another, and a fastening mechanism. Each of the unit cells includes a polymer electrolyte membrane, an anode and a cathode arranged across the polymer electrolyte membrane, an anode-side conductive separator plate having a gas flow path for feeding a supply of gaseous fuel to the anode, and a cathode-side conductive separator plate having a gas flow path for feeding a supply of oxidant gas to the cathode.

The fastening mechanism of the present invention includes: a first end plate disposed on one end of the stack of unit cells; a second end plate arranged on the other end of the stack of unit cells; an auxiliary plate disposed at least outside the first end plate; at least one set of restraining means, each of which has a band-like shape and restrains a first member located on one end of an assembly, which includes the stack of unit cells, the first and the second end plates, and the auxiliary plate, and a second member located on the other end of the assembly to restrict separation or unfastening of the first member and the second member from each other; a screw that is to be fitted in a threaded hole formed in the auxiliary plate in such a manner that an end of the screw comes into contact with the first end plate; and compressive means that generates a repulsive force to compress the stack of unit cells when the screw is fitted in the threaded hole of the auxiliary plate.

In accordance with one preferable mode of the present invention, the auxiliary plate includes a metal plate having elasticity and also functions as the compressive member.

In accordance with another preferable mode of the present invention, the fastening mechanism further includes a second auxiliary plate arranged outside the second end plate, and the compressive means is interposed between the second end plate and the second auxiliary plate.

In accordance with still another preferable mode of the present invention, the restraining means includes a band that surrounds the assembly and has an end fixed to the auxiliary plate.

In accordance with one preferable configuration of the present invention, the restraining means includes a pair of bands that are disposed on opposite side faces of the assembly and are fixed respectively to an end of the auxiliary plate and an end of the second end plate.

In accordance with another preferable configuration of the present invention,.which is applicable when the fastening mechanism has the second auxiliary plate, the restraining means includes a pair of bands that are disposed on opposite side faces of the assembly and are fixed respectively to an end of the auxiliary plate and an end of the second auxiliary plate.

In either one of the above configurations, the auxiliary plate linked with the set of restraining means is divided into a plurality of parallel parts, and each divisional auxiliary plate has a threaded hole, in which a screw is fitted.

The compressive means interposed between the second end plate and the second auxiliary plate is preferably a disc spring.

The restraining means preferably have heat insulating effects.

In one aspect of the present invention, a polymer electrolyte fuel cell comprises:

a stack of unit cells, each of the unit cells comprising a polymer electrolyte membrane, an anode and a cathode arranged across said polymer electrolyte membrane, an anode-side conductive separator plate having a gas flow path for feeding a supply of gaseous fuel to said anode, and a cathode-side conductive separator plate having a gas flow path for feeding a supply of oxidant gas to said cathode;

first and second end plates disposed on both ends of the stack of unit cells;

first and second auxiliary plates disposed on both ends of an assembly, which includes the stack of unit cells, the first and the second end plates, and the first and second auxiliary plates;

at least one set of restraining means, each of which has a band-like shape and restrains the first auxiliary plate and the second auxiliary plate from separating each other;

a screw fitted in a threaded hole formed in the auxiliary plate in such a manner that an end of the screw comes into contact with the first end plate; and compressive means that generates a repulsive force to compress the stack of unit cells when the screw is fitted in the threaded hole of the first auxiliary plate.

The present invention also comprehends a polymer electrolyte fuel cell which comprises:

a stack of unit cells, each of the unit cells comprising a polymer electrolyte membrane, an anode and a cathode arranged across said polymer electrolyte membrane, an anode-side conductive separator plate having a gas flow path for feeding a supply of gaseous fuel to said anode, and a cathode-side conductive separator plate having a gas flow path for feeding a supply of oxidant gas to said cathode;

a first end plate disposed on one end of the stack of unit cells;

a second end plate arranged on the other end of the stack of unit cells;

an auxiliary plate disposed outside the first end plate;

at least one set of restraining means, each of which has a band-like shape and restrains the auxiliary plate located on one end of an assembly, which includes the stack of unit cells, the first and the second end plates, and the auxiliary plate, and the second end plate located on the other end of the assembly to restrict separation of the auxiliary plate and the second end plate from each other;

a screw fitted in a threaded hole formed in the auxiliary plate in such a manner that an end of the screw comes into contact with the first end plate; and compressive means that generates a repulsive force to compress the stack of unit cells when the screw is fitted in the threaded hole of the auxiliary plate.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The following describes preferred embodiments of the present invention with reference to the accompanied drawings.

First Embodiment

Figure 1:
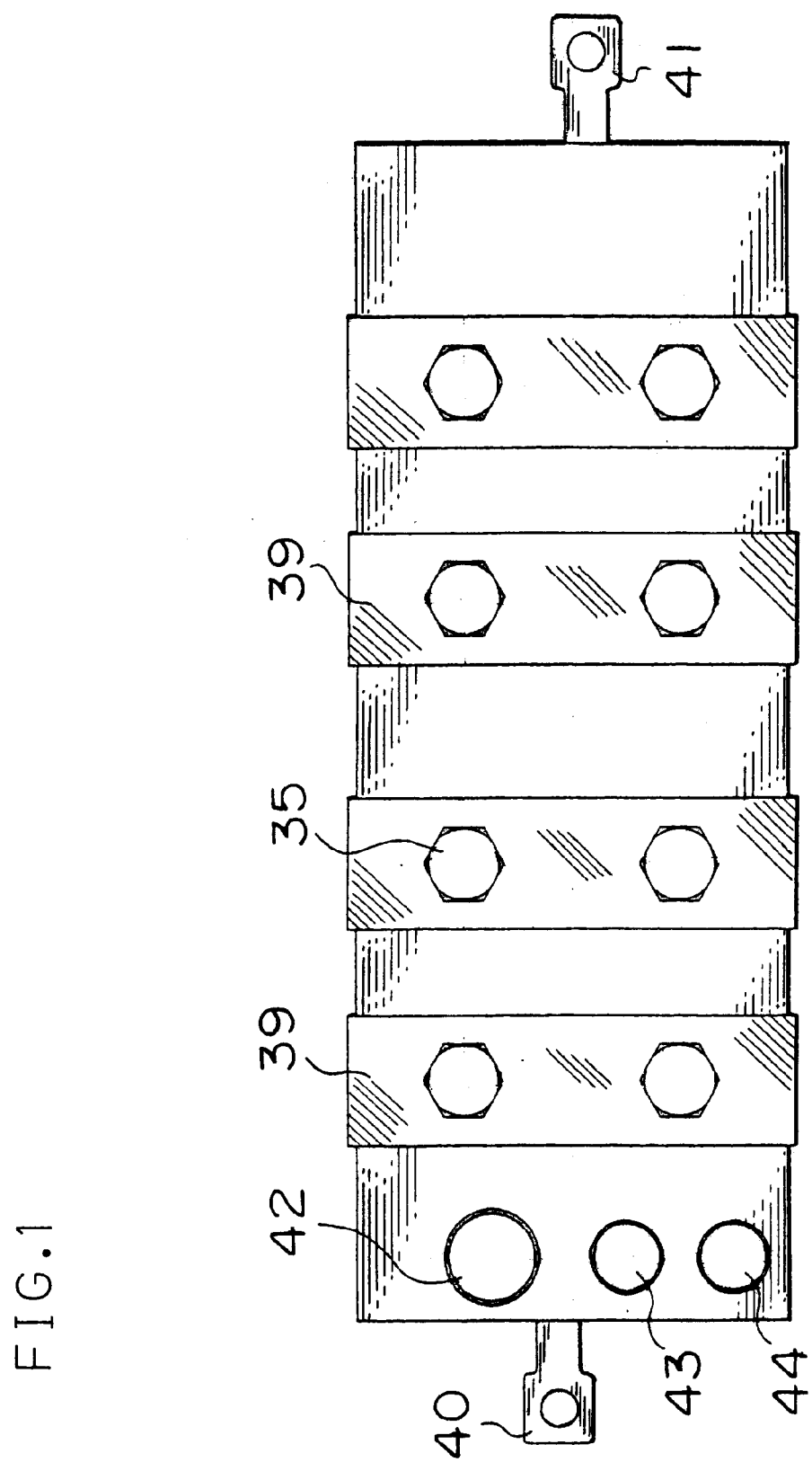
FIG. 1 is a plan view illustrating a polymer electrolyte fuel cell in one embodiment of the present invention.
Figure 2:
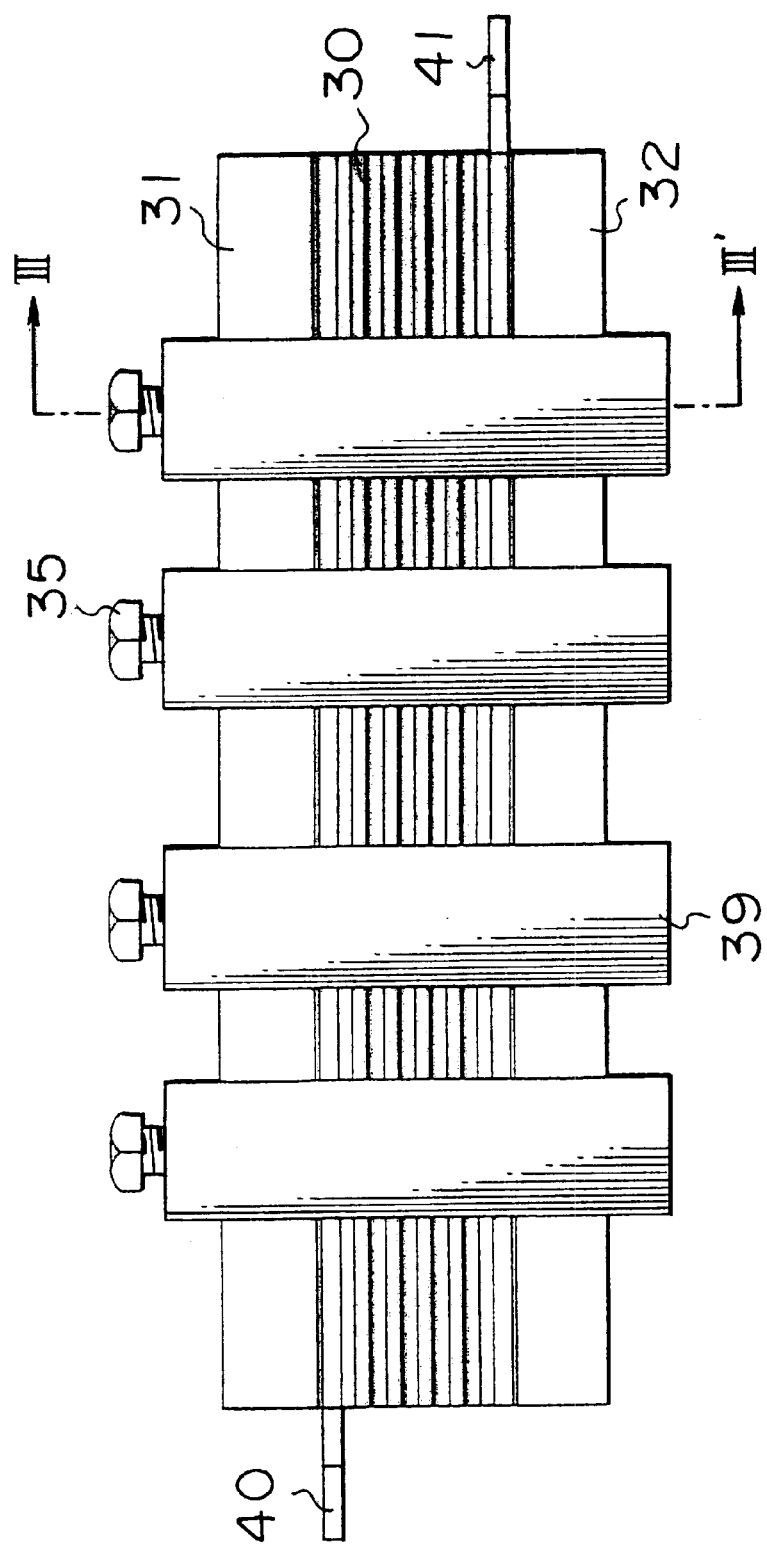
FIG. 2 is a front view illustrating the fuel cell of FIG. 1.
Figure 3:
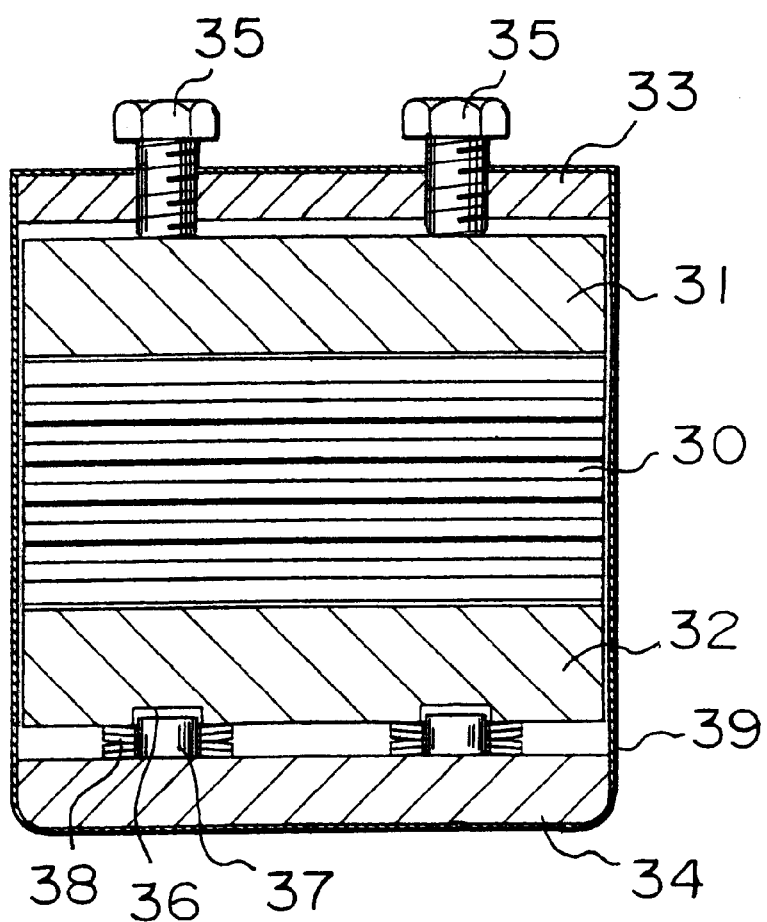
FIG. 3 is a sectional view, taken on the line III–III' of FIG. 2.

FIGS. 1 through 3 show a fastening mechanism of a fuel cell adopted in a first embodiment of the present invention.

A pair of end plates 31 and 32 are arranged across a stack of unit cells 30, which includes a plurality of unit cells. The stack of unit cells 30 with output terminals 40 and 41 is electrically insulated from the end plates 31 and 32 by insulator members, although not specifically illustrated. The assembly of the end plate 31, the stack of unit cells 30, and the end plate 32 are fastened together at four different positions. Namely the stack of unit cells 30 and the end plates 31 and 32 are fastened with four sets of fastening members. Each fastening member includes a restraining means 39, which includes a band surrounding the assembly, a first auxiliary plate 33 to which one end of the band is fixed, a second auxiliary plate 34 with a plurality of projections 37, which are formed corresponding to a plurality of recesses 36 formed in the bottom face of the end plate 32 and have disc springs 38 set thereon, and a plurality of screws 35 fitted in threaded holes formed in the first auxiliary plate 33.

When the screws 35 are bolted to the first auxiliary plate 33, the first auxiliary plate 33 moves in a direction apart from the end plate 31, so that the band 39 causes the second auxiliary plate 34 to move in a direction of compressing the springs 38. This arrangement accordingly fastens the stack of unit cells 30 via the end plates 31 and 32 and applies the required plane pressure to seals and electrodes. Inlets 42, 43, and 44 for supplies of gases fed to the electrodes and a flow of cooling water are arranged on the top side of the stack of unit cells 30, whereas their outlets are arranged on the opposite side, that is, on the bottom side of the stack of unit cells 30.

The following describes a concrete example of the first embodiment.

The process first soaked carbon powder having the particle diameter of not greater than several microns in an aqueous solution of chloroplatinic acid and caused the platinum catalyst to be carried on the surface of the carbon powder by reduction. The weight ratio of carbon to platinum carried thereon was one to one. The process then dispersed the carbon powder with the platinum catalyst carried thereon in an alcohol solution of a polymer electrolyte to yield a slurry.

Figure 9:
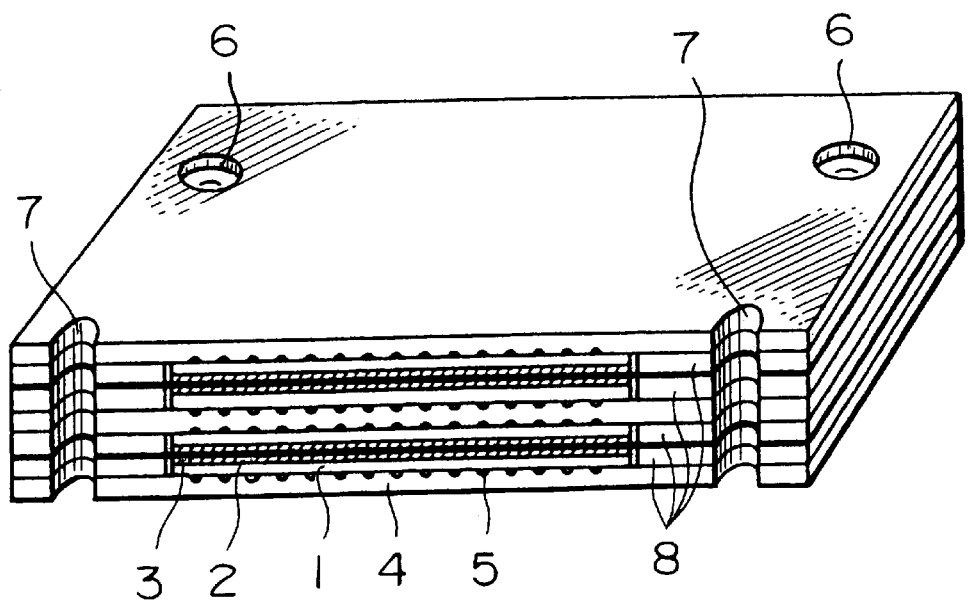
FIG. 9 is a partly omitted perspective view illustrating constituents of the polymer electrolyte fuel cell in the embodiment of the present invention.

The process, on the other hand, caused carbon paper having a thickness of 400 $\mu$m, which was the material of electrodes, to be impregnated with an aqueous dispersion of a fluorocarbon resin (Neoflon ND1 manufactured by Daikin Industries, Ltd.) The process then dried the impregnated carbon paper and heated at 400° C. for 30 minutes to give the water repellency to the carbon paper. As shown in FIG. 9, the process homogeneously applied the slurry containing the carbon powder on one face of a water-repelled carbon paper electrode 1 to form a catalytic layer 2. The process laid a pair of the carbon paper electrodes 1 across a polymer electrolyte membrane 3 in such a manner that the respective catalytic layers 2 of the carbon paper electrodes 1 were in contact with the polymer electrolyte membrane 3, and dried the layered structure to yield a membrane electrode assembly (MEA). Each of the two carbon paper electrodes 1 had both a length and a width of 10 cm and was disposed on the center of the larger polymer electrolyte membrane 3 having both a length and a width of 12 cm. The MEA was interposed between a pair of carbon separator plates 4 having air tightness to yield a unit cell. The separator plate 4 is 4 mm in thickness and has a large number of gas flow paths 5, which have a width of 2 mm and a depth of 1 mm and have been cut in its surface. The separator plate 4 also has a plurality of gas manifold holes 6 and a plurality of cooling water manifold holes 7 formed on its circumferential part. In the process of interposing the MEA between the pair of separator plates 4, polyethylene terephthalate (PET) sheets 8 having the same dimensions as those of the carbon separator plates 4 are arranged around the electrodes 1. The PET sheet, which is hard and does not have the sealing property, was used as a spacer between the carbon separator plate 4 and the electrolyte membrane 3. After lamination of two such unit cells, the process disposed a pair of separator plates each having a cooling water flow path, through which the cooling water flows, across the laminated unit cells to give a unit stack of unit cells. Repetition of this pattern completed a stack of unit cells. In this example, no O ring for sealing was used between the separator plates having the cooling water flow path.

The process laid 50 unit stack of unit cells one upon another and disposed metal current collectors and insulator plates composed of an electrically insulating material on both ends of the layered structure, so as to complete a stack of unit cells.

The pair of end plates are arranged across the stack of unit cells as part of the fastening mechanism according to the first embodiment discussed above with FIGS. 1 through 3. The fastening mechanism of this embodiment attains the sufficient compressive force by means of the four metal bands 39 (SUS304-CSP) having a thickness of 1 mm and a width of 22 mm, the end plates 31 and 32, the first and second auxiliary plates 33 and 34, and the disc springs 38. The spring constant of the springs 38 was 500 kgf/mm. A compressive force of 400 kg per position was applied under the compression of 0.8 mm. The compressive force in assembly was 13 kgf/cm$^2$. The pressure distribution of the separator plate was measured with a pressure sensitive paper. The result showed a substantially uniform pressure distribution over the whole surface of the separator plate. Compared with the conventional arrangement that disposes tie rods outside the separator plates to apply the compressive force, the technique of this embodiment desirably applies the compressive force inside the separator plate and thus significantly reduces deformation of the end plates. This enables the thickness of each end plate to be thinner of not greater than 5 mm.

Second Embodiment

Figure 4:
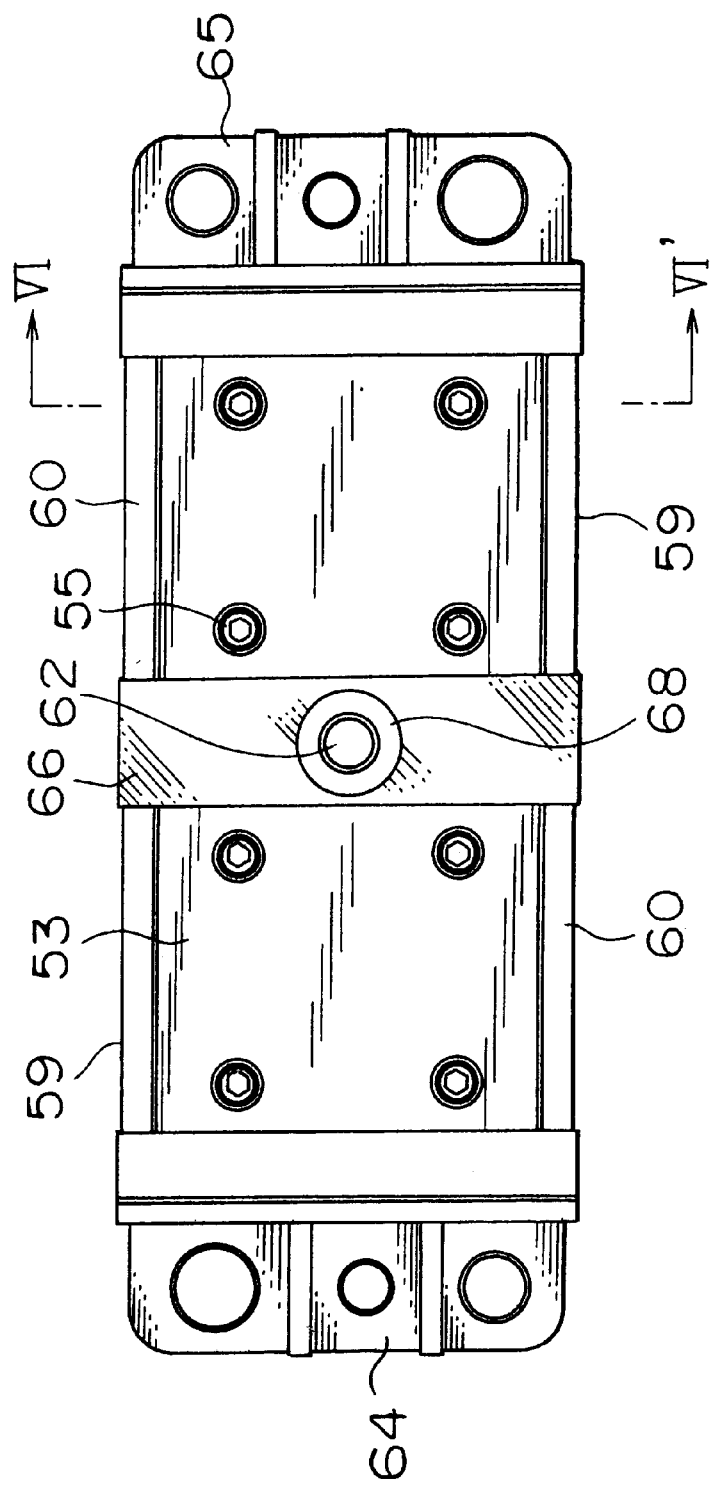
FIG. 4 is a plan view illustrating another polymer electrolyte fuel cell in another embodiment of the present invention.
Figure 5:
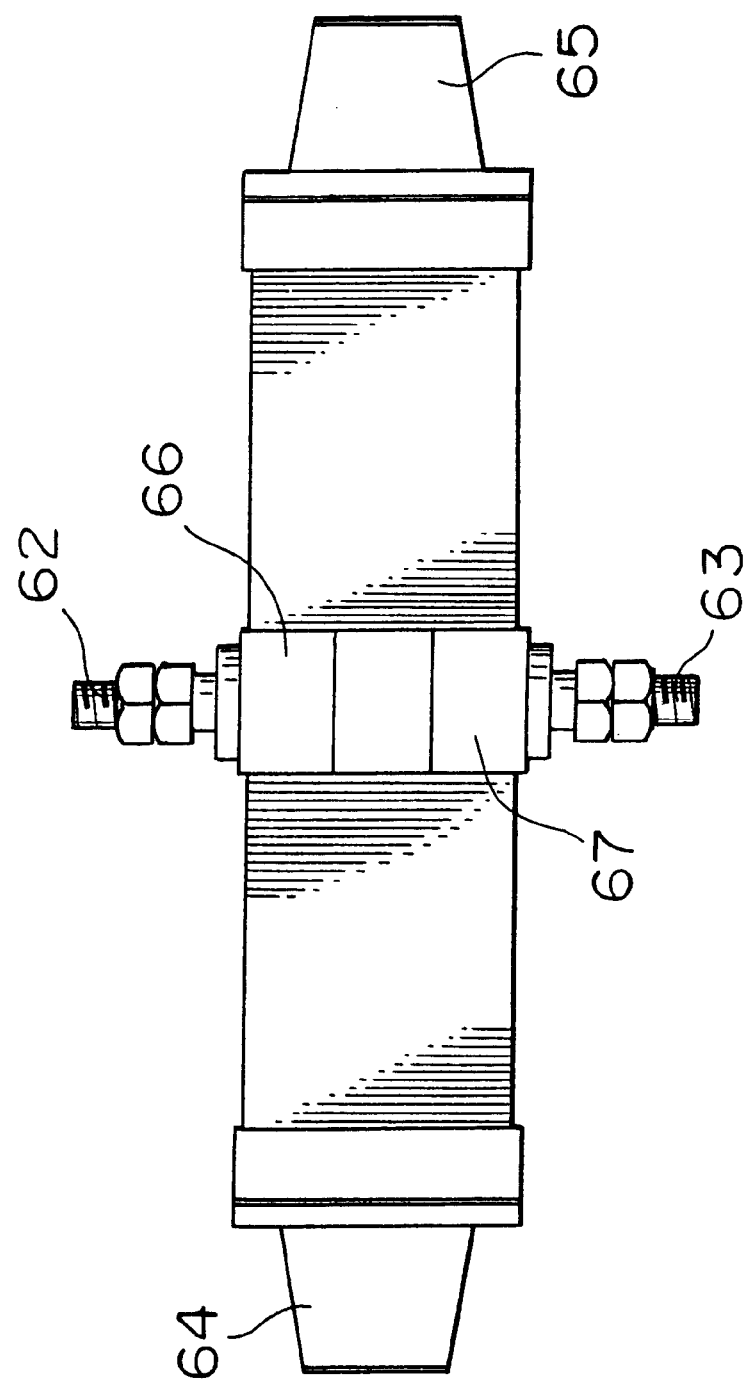
FIG. 5 is a front view illustrating the fuel cell of FIG. 4.
Figure 6:
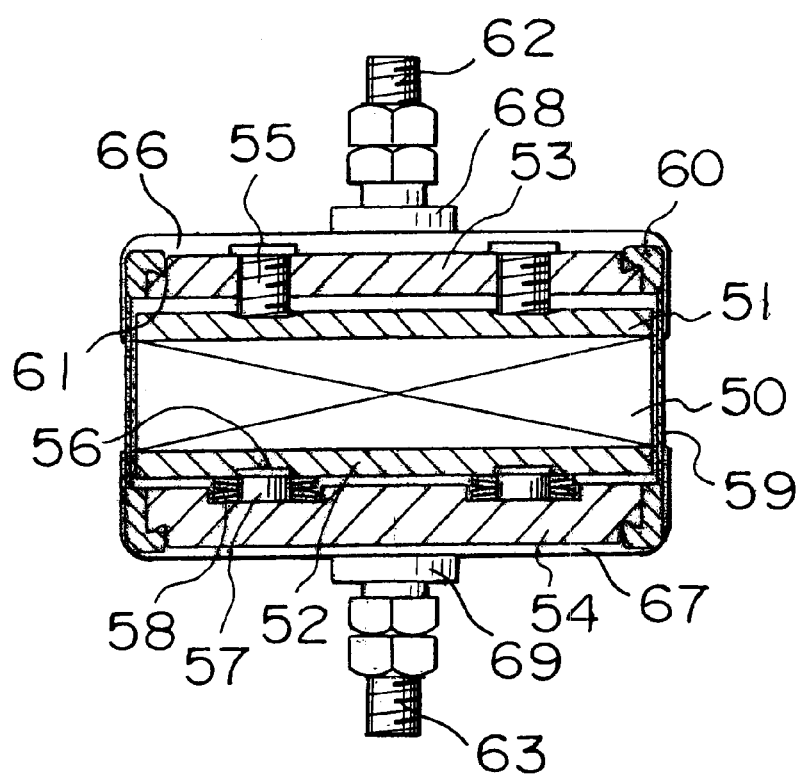
FIG. 6 is a sectional view, taken on the line VI–VI' of FIG. 4.

FIGS. 4 through 6 show another fastening mechanism of the fuel cell applied in a second embodiment of the present invention.

A pair of end plates 51 and 52 are arranged across a stack of unit cells 50, which includes a plurality of unit cells. A first auxiliary plate 53 with screws 55 fitted in threaded holes is disposed above the end plate 51, whereas a second auxiliary plate 54 having a plurality of projections 57, which correspond to recesses 56 formed in the bottom face of the end plate 52 and have disc springs 58 set thereon, is disposed below the end plate 52. The first auxiliary plate 53 and the second auxiliary plate 54 are joined with each other via restraining means, which include bands 59 having hooks to engage with recesses 61 formed on the periphery of the auxiliary plates 53 and 54. When the screws 55 are bolted to the first auxiliary plate 53, the springs 57 are compressed to fasten the stack of unit cells 50 via the end plates 51 and 52 and apply the required plane pressure to seals and electrodes.

In this embodiment, the two sets of the fastening members, each including the first and second auxiliary plates 53 and 54 and the band 59, are used to fasten the stack of unit cells 50 and the end plates 51 and 52. The four screws 55 are attached to each auxiliary plate 53.

Output terminals 62 and 63 of this fuel cell are disposed on the top and bottom of the fuel cell, respectively. These output terminals 62 and 63 are respectively connected to current collectors, which are arranged inside the end plates 51 and 52 via insulator plates. Metal plates 66 and 67 respectively insulated from the output terminals 62 and 63 by insulating collars 68 and 69 are attached to the end plates 51 and 52, for example, by welding. The metal plates 66 and 67 prevent the first and the second auxiliary plates 53 and 54 from being shifted laterally due to the compressive force. A manifold 64 having gas inlets for feeding supplies of gases to the electrodes and a cooling water inlet and a mainifold 65 having gas outlets and a cooling water outlet are disposed on opposite side faces of the stack of unit cells 50. The manifolds 64 and 65 also have the same functions as those of the metal plates 66 and 67.

The following describes a concrete example of the second embodiment.

Figure 10:
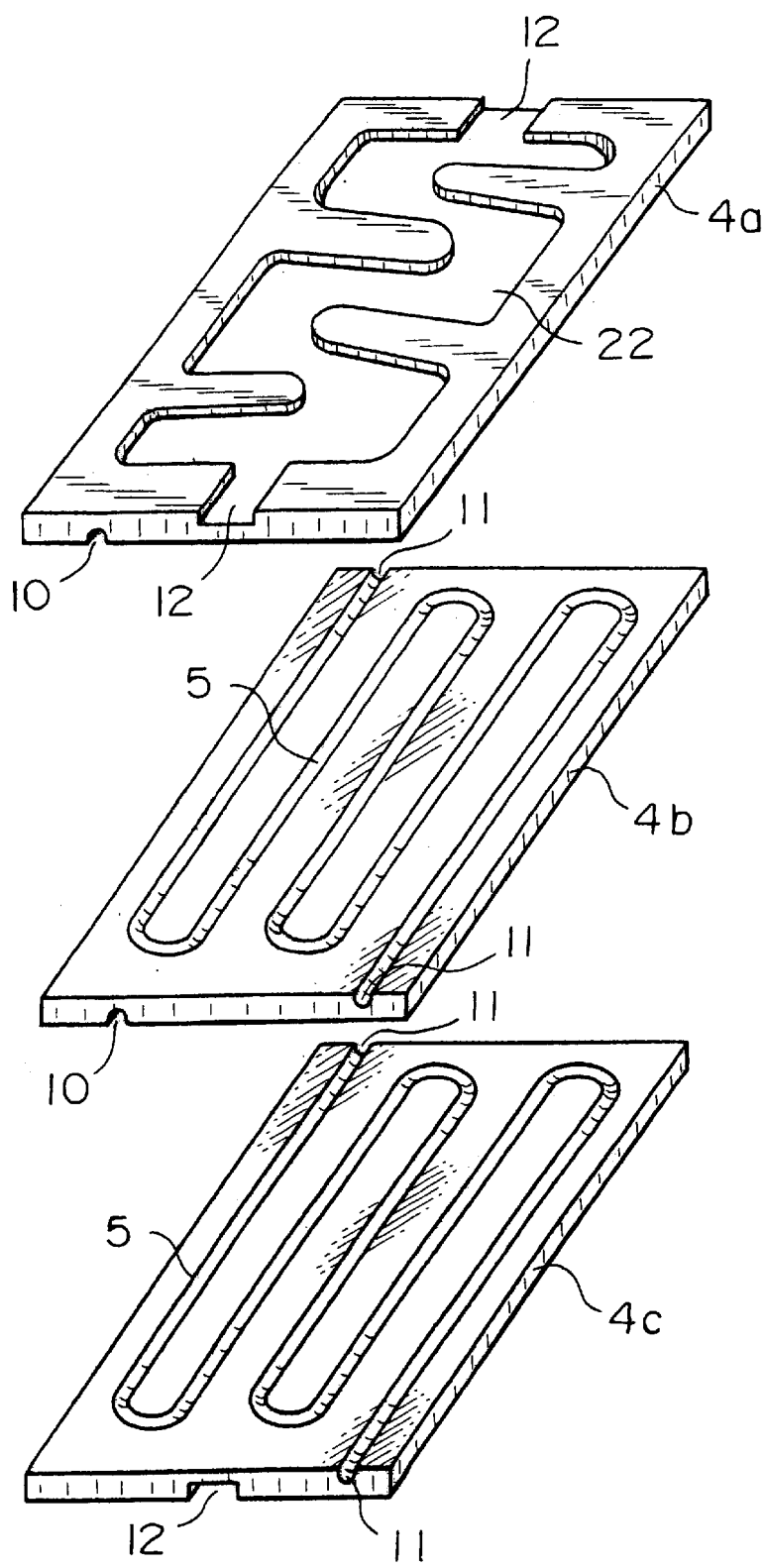
FIG. 10 is a perspective view illustrating separator plates used in the embodiment of the present invention.
Figure 11:
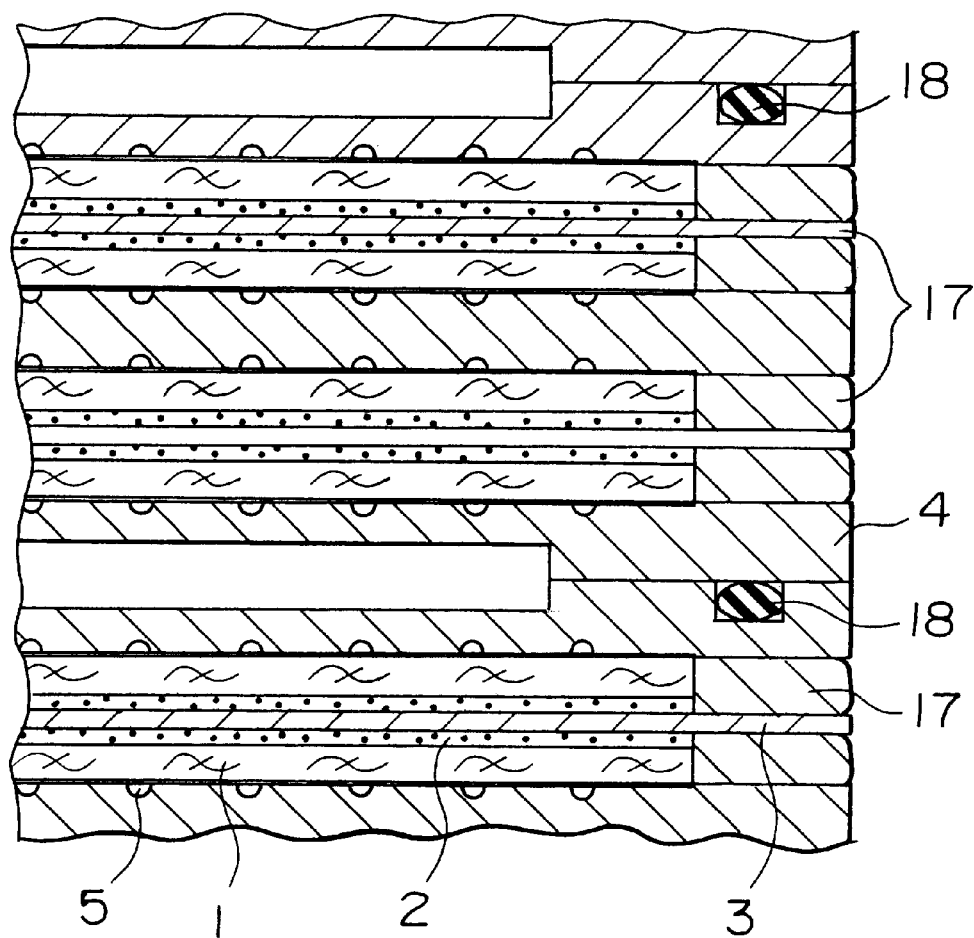
Fig. 11 is a sectional view illustrating one configuration of a prior art polymer electrolyte fuel cell.
Figure 12:
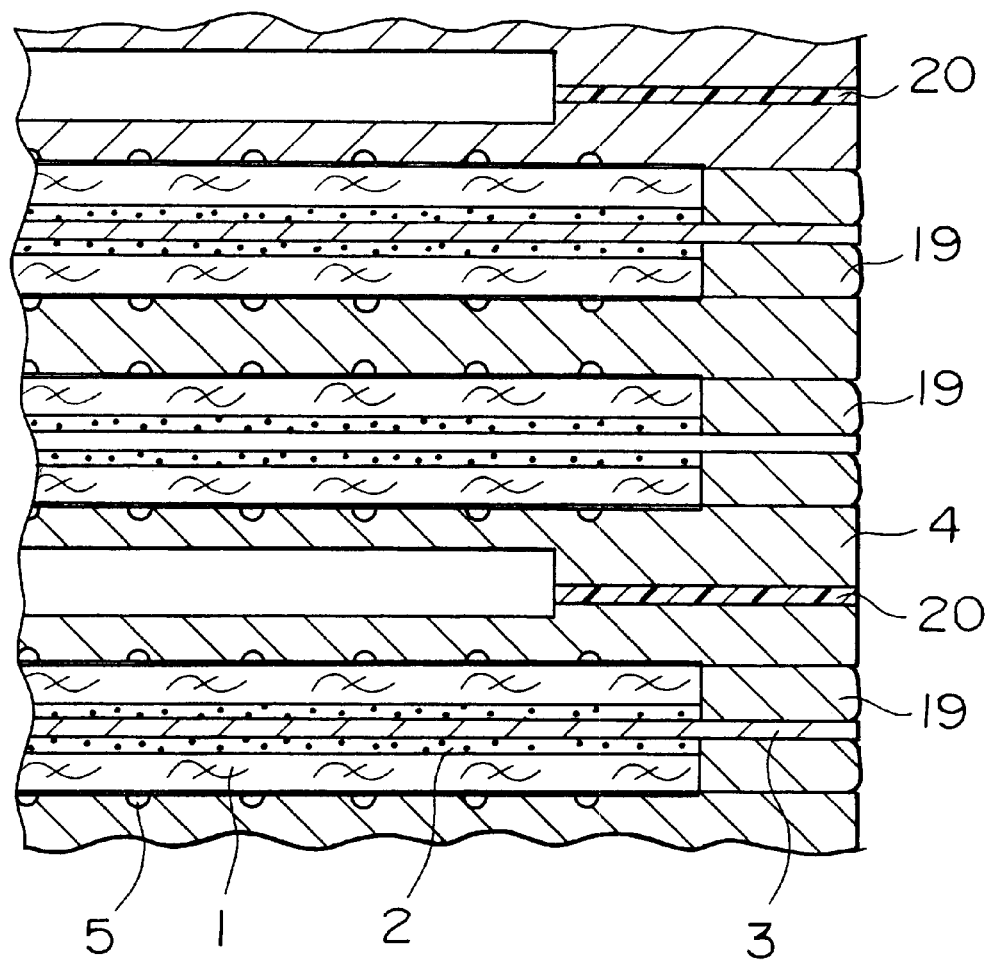
FIG. 12 is a sectional view illustrating another configuration of the prior art polymer electrolyte fuel cell.
Figure 13:
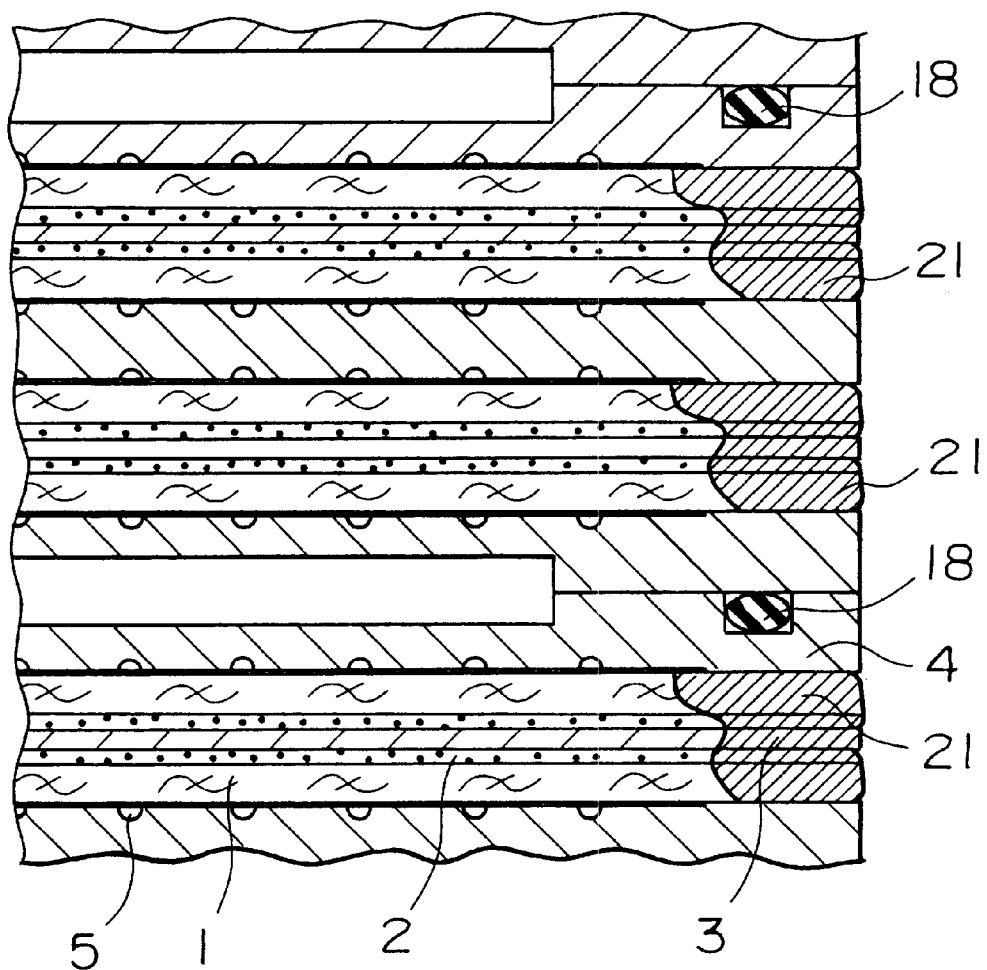
FIG. 13 is a sectional view illustrating still another configuration of the prior art polymer electrolyte fuel cell.

In the example of the first embodiment discussed above, the spacers of the PET sheets are arranged around the electrodes in the MEA. The example of the second embodiment does not use the PET sheets but forms the carbon paper electrodes with the catalytic layers applied thereon to the same outer dimensions as those of the carbon separator plates. The ends of the electrodes are accordingly exposed to the side faces of the stack of unit cells. The carbon separator plates used here are for the external manifold arrangement as shown in FIG. 10. A separator plate 4a used for every two unit cells has a cooling water flow path 22 and its openings 12 on one face thereof and has, for example, a gas flow path 12 for the gaseous fuel and its openings 10 on the other face thereof. A separator plate 4b is disposed to be in contact with a counter electrode, which mates the electrode that is in contact with the face of the separator plate 4a with the openings 10 of the gas flow path. The separator plate 4b has a gas flow path 5 for the oxidant gas and its openings 11 on the face in contact with the counter electrode, and has a gas flow path for the gaseous fuel and its openings 10 on the other face thereof. A separator plate 4c facing the separator plate 4b via a unit cell has a gas flow path 5 for the oxidant gas and its openings 11 on one face thereof, and has a cooling water flow path and its openings 12 on the other face thereof.

A manifold for feeding supplies of the gaseous fuel, the oxidant gas, and the cooling water to the openings 10 and 11 of the gas flow paths and the opening of the cooling water flow path is disposed on one side face of the stack of unit cells. A manifold for discharging exhausts of the gaseous fuel, the oxidant gas, and the cooling water from the openings 10 and 11 of the gas flow paths and the opening of the cooling water flow path is disposed on the opposite side face of the stack of unit cells.

The pair of end plates are arranged across the stack of unit cells as part of a fastening mechanism according to the second embodiment discussed above with FIGS. 4 through 6. The fastening mechanism of this embodiment attains the sufficient compressive force by means of the two metal bands 59 (SUS304-CSP) having a thickness of 1 mm and a width of 75 mm, the end plates 51 and 52, the first and second auxiliary plates 53 and 54, the disc springs 58, and the screws 55. The spring constant of the springs 58 was 500 kgf/mm. A compressive force of 400 kg per position was applied under the compression of 0.8 mm. The compressive force in assembly was 13 kgf/cm$^2$. Hooks 60 are welded to the ends of the band 59, in order to enable the band 59 to be freely attached to and detached from the stack of unit cells. This improves the performance of assembling, compared with the arrangement of the first embodiment.

Third Embodiment

Figure 7:
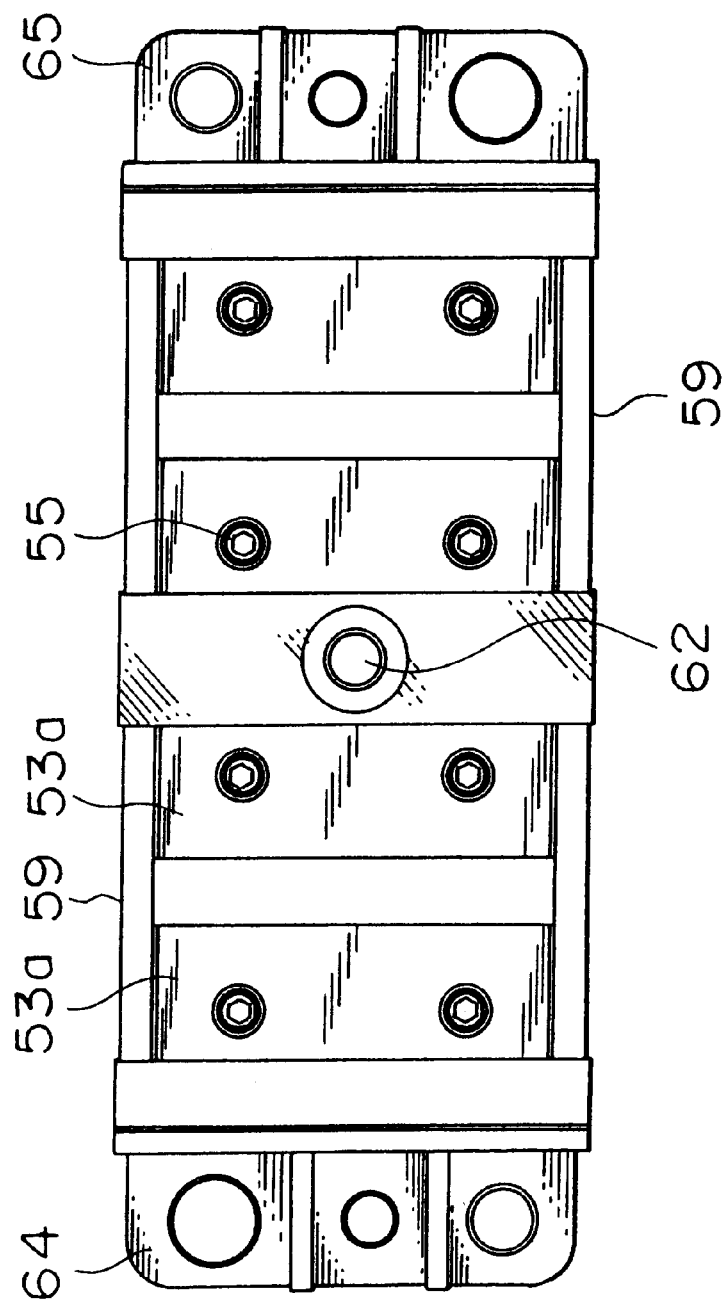
FIG. 7 is a plan view illustrating another polymer electrolyte fuel cell in still another embodiment of the present invention.

FIG. 7 shows still another fastening mechanism of the fuel cell adopted in a third embodiment of the present invention.

The second embodiment uses the two sets of the fastening members and fixes the auxiliary plates 53 in the respective fastening members with two sets of screws. The third embodiment, on the other hand, uses four sets of fastening members and fixes auxiliary plates 53a in the respective fastening members with one set of screws. The other configuration of the third embodiment is identical with that of the second embodiment.

The following describes a concrete example of the third embodiment.

The pair of end plates are arranged across the stack of unit cells of the second embodiment as part of a fastening mechanism according to the third embodiment shown in FIG. 7. The fastening mechanism of this embodiment attains the sufficient compressive force by means of the four metal bands 59 (SUS304-CSP) having a thickness of 1 mm and a width of 75 mm, the end plates 51 and 52, the first and second auxiliary plates 53*a* and 54, the disc springs 58, and the screws 55. The spring constant of the springs 58 was 500 kgf/mm. A compressive force of 400 kg per position was applied under the compression of 0.8 mm. The compressive force in assembly was 13 kgf/cm$^2$. The third embodiment divides the auxiliary plate 53 used in the second embodiment into two parts. In the second embodiment, each auxiliary plate 53 is fastened with four screws. If the band 59 has poor mechanical accuracy, the load is not evenly applied to the four screws. The structure of this embodiment, on the other hand, fastens each auxiliary plate 53*a* with two screws, thereby ensuring even application of the load to the two screws. The pressure distribution of the separator plate was measured with a pressure sensitive paper. The result showed a substantially uniform pressure distribution over the whole surface of the separator plate.

Although this embodiment divides the auxiliary plate with the screws into two parts, the similar effects can be exerted by dividing the auxiliary plate with the springs into two parts.

Fourth Embodiment

Figure 8:
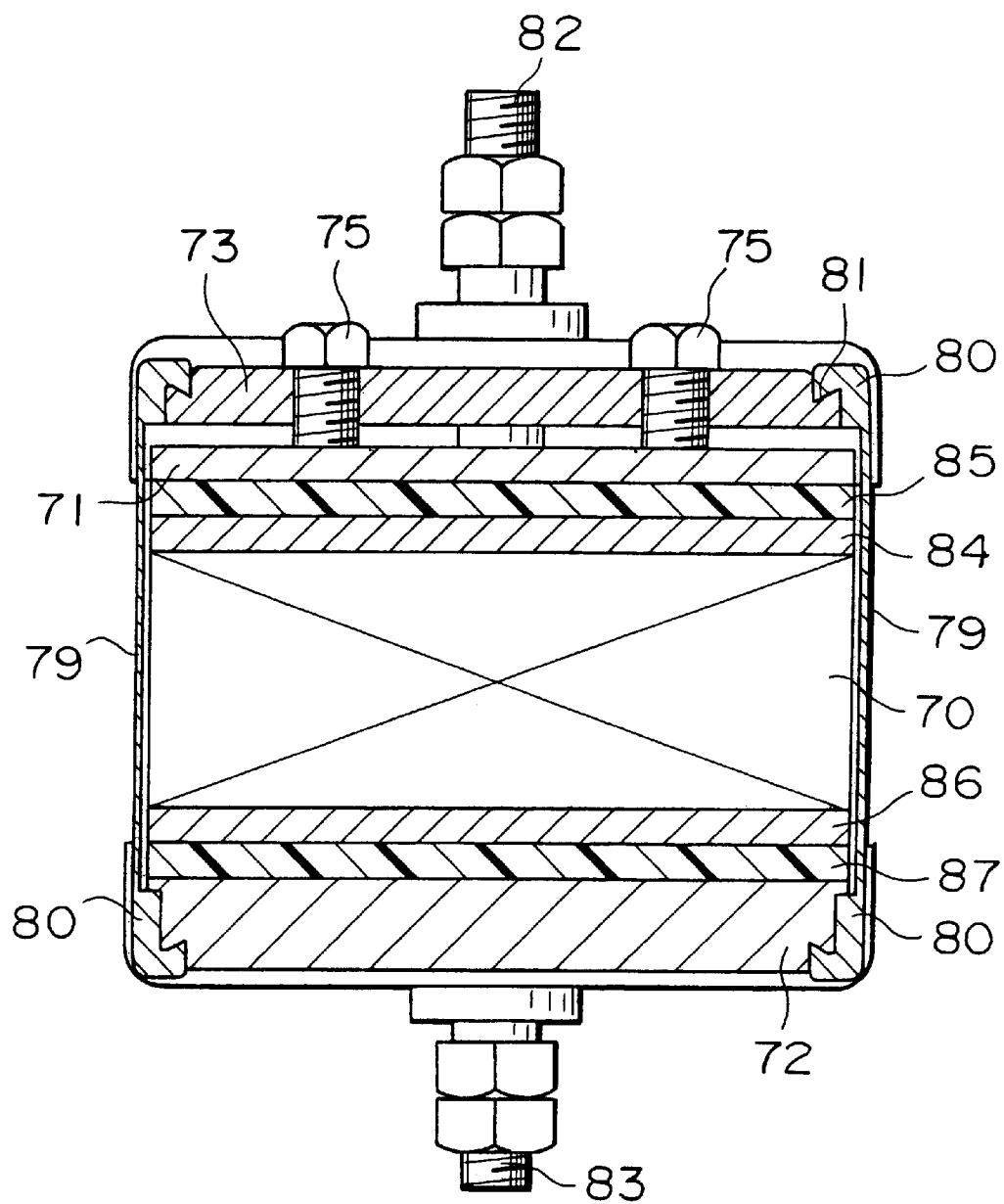
FIG. 8 is a sectional view illustrating still another polymer electrolyte fuel cell in another embodiment of the present invention.

FIG. 8 shows another fastening mechanism of the fuel cell adopted in a fourth embodiment according to the present invention. In this embodiment, an auxiliary plate 73 also functions as the compressive member.

A pair of end plates 71 and 72 are arranged across a stack of unit cells 70, which includes a plurality of unit cells, via a pair of current collectors 84 and 86 and a pair of insulator plates 85 and 87. An auxiliary plate 73 with threaded holes, in which screws 75 are fitted, is disposed above the end plate 71. The auxiliary plate 73 and the end plate 72 are joined with each other via a band 79 having hooks 80 that engage with recesses 81 formed at the corners of the auxiliary plate 73 and the end plate 72. When the screws 75 are fitted in the threaded holes of the auxiliary plates 73, the ends of the screws 75 press the end plate 71. The auxiliary plate 73 and the end plate 72 are connected with each other via the restraining means 79, so that the stack of unit cells 70 is compressed with the screw-in motion of the screws 75. The auxiliary plate 73 functions as the compressive member, and the stack of unit cells 70 is compressed by the compressive force of the compressive member. The compressed stack of unit cells 70 is subjected to creep deformation with an elapse of time, because of the characteristics of the material. The leaf spring mechanism of the auxiliary plate 73, however, absorbs the creep deformation and enables a stable compressive force to be constantly applied to the stack of unit cells 70.

The output of the fuel cell is supplied to external equipment (not shown) via output terminals 82 and 83 respectively connected to the current collectors 84 and 86. The other configuration of the fourth embodiment is identical with that of the third embodiment.

The arrangement of the present invention makes the mechanism for applying the fastening force to a stack of unit cells assembly desirably small-sized and light-weighted, thereby effectively decreasing the total weight of the fuel cell.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polymer electrolyte fuel cell comprising:
    a stack of unit cells, each of said unit cells comprising a polymer electrolyte membrane, an anode and a cathode arranged across said polymer electrolyte membrane, an anode-side conductive separator plate having a gas flow path for feeding a supply of gaseous fuel to said anode, and a cathode-side conductive separator plate having a gas flow path for feeding a supply of oxidant gas to said cathode;
    a first end plate disposed on one end of said stack of unit cells;
    a second end plate arranged on the other end of said stack of unit cells;
    an auxiliary plate disposed at least outside said first end plate;
    at least one set of restraining means, each of which has a band shape that surrounds and restrains an assembly said assembly includes said stack of unit cells, said first and the second end plates, and said auxiliary plate,
    a screw fitted in a threaded hole formed in said auxiliary plate in such a manner that an end of said screw comes into contact with said first end plate; and
    compressive means that generates a repulsive force to compress said stack of unit cells when said screw is fitted in the threaded hole of said auxiliary plate.

2. A polymer electrolyte fuel cell in accordance with claim 1, wherein said auxiliary plate comprises a metal plate having elasticity and also functions as said compressive means.

3. A polymer electrolyte fuel cell in accordance with claim 1, said polymer electrolyte fuel cell further comprising a second auxiliary plate arranged outside said second end plate, wherein said compressive means is interposed between said second end plate and said second auxiliary plate.

4. A polymer electrolyte fuel cell in accordance with claim 1, wherein said restraining means comprises a band that surrounds said assembly and has an end fixed to said auxiliary plate.

5. A polymer electrolyte fuel cell in accordance with claim 1, wherein said restraining means comprises a pair of bands that are disposed on opposite side faces of said assembly and are fixed respectively to an end of said auxiliary plate and an end of said second end plate.

6. A polymer electrolyte fuel cell in accordance with claim 2, wherein said restraining means comprises a pair of bands that are disposed on opposite side faces of said assembly and are fixed respectively to an end of said auxiliary plate and an end of said second auxiliary plate.

7. A polymer electrolyte fuel cell in accordance with claim 5, wherein said auxiliary plate linked with said set of restraining means is divided into a plurality of parallel parts, and each divisional auxiliary plate has a threaded hole, in which a screw is fitted.

8. A polymer electrolyte fuel cell in accordance with claim 6, wherein said auxiliary plate linked with said set of restraining means is divided into a plurality of parallel parts, and each divisional auxiliary plate has a threaded hole, in which a screw is fitted.

9. A polymer electrolyte fuel cell comprising:

a stack of unit cells, each of said unit cells comprising a polymer electrolyte membrane, an anode and a cathode arranged across said polymer electrolyte membrane, an anode-side conductive separator plate having a gas flow path for feeding a supply of gaseous fuel to said anode, and a cathode-side conductive separator plate having a gas flow path for feeding a supply of oxidant gas to said cathode;

first and second end plates disposed on both ends of said stack of unit cells;

first and second auxiliary plates disposed on both ends of an assembly, which includes said stack of unit cells, said first and the second end plates, and said first and second auxiliary plates;

at least one set of restraining means, each of which has a band shape and restrains said first auxiliary plate and said second auxiliary plate from separating each other;

a screw fitted in a threaded hole formed in said auxiliary plate in such a manner that an end of said screw comes into contact with said first end plate; and compressive means that generates a repulsive force to compress said stack of unit cells when said screw is fitted in the threaded hole of said first auxiliary plate.

10. A polymer electrolyte fuel cell in accordance with claim 9, wherein said restraining means comprises a band that surrounds said assembly and has an end fixed to said first or second auxiliary plate.

11. A polymer electrolyte fuel cell in accordance with claim 9, wherein said restraining means comprises a pair of bands that are disposed on opposite side faces of said assembly and are fixed respectively to an end of said first auxiliary plate and an end of said second auxiliary plate.

12. A polymer electrolyte fuel cell in accordance with claim 9, wherein said restraining means comprises a pair of bands that are disposed on opposite side faces of said assembly and are fixed respectively to an end of said first auxiliary plate and an end of said second auxiliary plate.

13. A polymer electrolyte fuel cell in accordance with claim 11, wherein said auxiliary plate linked with said set of restraining means is divided into a plurality of parallel parts, and each divisional auxiliary plate has a threaded hole, in which a screw is fitted.

14. A polymer electrolyte fuel cell comprising:

a stack of unit cells, each of said unit cells comprising a polymer electrolyte membrane, an anode and a cathode arranged across said polymer electrolyte membrane, an anode-side conductive separator plate having a gas flow path for feeding a supply of gaseous fuel to said anode, and a cathode-side conductive separator plate having a gas flow path for feeding a supply of oxidant gas to said cathode;

a first end plate disposed on one end of said stack of unit cells;

a second end plate arranged on the other end of said stack of unit cells;

an auxiliary plate disposed outside said first end plate;

at least one set of restraining means, each of which has a band shape and restrains said auxiliary plate located on one end of an assembly, which includes said stack of unit cells, said first and the second end plates, and said auxiliary plate, and said second end plate located on the other end of said assembly to restrict separation of said auxiliary plate and said second end plate from each other;

a screw fitted in a threaded hole formed in said auxiliary plate in such a manner that an end of said screw comes into contact with said first end plate; and compressive means that generates a repulsive force to compress said stack of unit cells when said screw is fitted in the threaded hole of said auxiliary plate.

15. A polymer electrolyte fuel cell in accordance with claim 14, wherein said restraining means comprises a band that surrounds said assembly and has an end fixed to said auxiliary plate.

16. A polymer electrolyte fuel cell in accordance with claim 14, wherein said restraining means comprises a pair of bands that are disposed on opposite side faces of said assembly and are fixed respectively to an end of said auxiliary plate and an end of said second end plate.

17. A polymer electrolyte fuel cell in accordance with claim 14, wherein said restraining means comprises a pair of bands that are disposed on opposite side faces of said assembly and are fixed respectively to an end of said auxiliary plate and an end of said second auxiliary plate.

18. A polymer electrolyte fuel cell in accordance with claim 14, wherein said auxiliary plate linked with said set of restraining means is divided into a plurality of parallel parts, and each divisional auxiliary plate has a threaded hole, in which a screw is fitted.

* * * * *